United States Patent [19]

Cox

[11] 3,741,622

[45] June 26, 1973

[54] VARIABLE MAGNIFICATION OPTICAL SYSTEM

[75] Inventor: Arthur Cox, Park Ridge, Ill.

[73] Assignee: The Austin Company, Cleveland, Ohio

[22] Filed: Aug. 4, 1971

[21] Appl. No.: 168,893

[52] U.S. Cl. .................. 350/40, 350/50, 350/55, 350/199
[51] Int. Cl. ............................................. G02b 7/04
[58] Field of Search ............... 350/40–44, 8, 50, 51, 55, 199; 355/57, 60

[56] References Cited
UNITED STATES PATENTS

| | | |
|---|---|---|
| 2,725,800 | 12/1955 | Dewhirst .......................... 350/55 X |
| 3,088,368 | 5/1963 | Tripp et al. ...................... 350/202 X |
| 3,152,214 | 10/1964 | Korones et al. .................... 350/54 X |
| 3,432,219 | 3/1969 | Shenker et al. .................... 350/55 X |
| 1,116,069 | 11/1914 | Jacob ............................... 350/51 X |
| 2,171,360 | 8/1939 | Strang .............................. 350/46 |
| 2,536,718 | 1/1951 | Brandon ........................... 350/43 |
| 3,030,857 | 4/1962 | Shumway ......................... 350/287 X |
| 3,507,576 | 4/1970 | Linde ................................ 350/44 X |

Primary Examiner—David H. Rubin
Attorney—Woodling, Krost, Granger & Rust

[57] ABSTRACT

A variable magnification optical system is disclosed utilizing movable focus devices and movable reflective devices to obtain an extremely wide variation in magnification. A concave mirror and correcting lens is used for image input to the optical system and to correct the Petzval sum of the system.

13 Claims, 3 Drawing Figures

PATENTED JUN 26 1973

INVENTOR.
ARTHUR COX
BY Woodling Krost,
Granger and Rust
ATTORNEYS.

3,741,622

VARIABLE MAGNIFICATION OPTICAL SYSTEM

BACKGROUND OF THE INVENTION

This invention relates to optical systems and more particularly to optical systems having a variable magnification.

Variable magnification optical systems have been known to the prior art for many years. The prior art can be divided into two classes of variable magnification optical systems. The first class utilizes the principle of the relative movement of lenses elements to change the effective focal length of the optical system. This relative movement of the lenses makes it virtually impossible to balance exactly the aberrations of the optical system. The lens elements in the optical system can be shaped to eliminate aberrations at only one condition of lens separation. Thus, the lenses are shaped to compromise the aberrations within the useful range of the optical system. The optical systems employing variable focal length lenses are in general expensive and require a complex mechanical system to effect the variation in magnification. The mechanical system is normally sensitive to backlash and causes lateral movement of the image during variations in magnification. These systems also require a large movement of optical elements adding to the length and cost of the system. Finally, variable magnification optical systems using the variable focal length principle have been limited to a variation in magnification in the order of 20:1.

The second class of variable magnification optical systems known to the prior art is the type utilizing the principle of movable fixed focal length lenses and movable reflecting surfaces. These systems offer the advantage of a wide zoom range at a reasonable cost. In addition, the problems of aberrations encountered with the first class of variable magnification optical systems are not as acute in this class of optical system. However, the mechanical system required for this second class of optical system is still complex. The systems are still subject to mechanical backlash and lateral movement of the image during variations in magnification. The complex mechanical system makes the system extremely difficult to focus during operation at high magnifications. Although some prior art systems have claimed to be able to obtain variations in magnification as high as 50 to 100 times as great as the lowest power of the system, this range of magnification has heretofore been most difficult to achieve in an actual system. Systems boasting such ranges were in fact, limited to a substantially reduced magnification range due to problems of focus caused by mechanical instability. Finally, in the prior art optical systems of the second class, there is no provision to correct for curvature of field by satisfying the Petzval condition of the system.

Therefore, an object of this invention is to produce a variable magnification optical system which has a wide zoom range typically 50:1.

Another object of this invention is to produce a variable magnification optical system which is inexpensive.

Another object of this invention is to produce a variable magnification optical system which has a high quality and approaches a diffraction limited optical system.

Another object of this invention is to produce a variable magnification optical system which requires a simple mechanical system to effect variations in magnification.

Another object of this invention is to produce a variable magnification optical system which is not affected by backlash and is easy to focus.

Another object of this invention is to produce a variable magnification optical system with reduced lateral movement during variations in magnification.

Another object of this invention is to produce a variable magnification optical system with a minimum number of moving optical elements.

Another object of this invention is to produce a variable magnification optical system which requires a smaller displacement of optical elements than the prior art systems.

Another object of this invention is to produce a variable magnification optical system with no relative movement of lens components with respect to one another.

Another object of this invention is to produce a variable magnification optical system with greatly reduced aberrations.

Another object of this invention is to produce a variable magnification optical system with a corrected Petzval condition.

Finally, an object of this invention is to produce a variable magnification optical system which has a fixed exit pupil.

SUMMARY OF THE INVENTION

The invention may be incorporated in a variable magnification optical system, comprising in combination, first through fourth optical planes, said planes being in fixed spatial relationship, means establishing an image on said first plane, first and second imaging means each having a focal length, a first optical path from said first imaging means to said first plane, a second optical path from said first imaging means to said second plane, a third optical path from said second imaging means to said third plane, a fourth optical path from said second imaging means to said fourth plane, first optical means changing at least one of said first and second optical paths, second optical means including a plurality of reflecting surfaces in which a first of said surfaces is movable to change one of said first and second optical paths in accordance with said first optical means, third optical means changing at least one of said third and fourth optical paths, and fourth optical means including a plurality of reflecting surface in which a first of said surfaces is movable to change one of said third and fourth optical paths in accordance with said third optical means, whereby an image on said first plane is transferred through said paths in sequence to appear on said fourth plane with variable magnification.

Other objects and a fuller understanding of the invention may be had by referring to the following description and claims, taken in conjunction with the accompanying drawing.

DESCRIPTION OF THE PREFERRED EMBODIMENT

Figure 1:
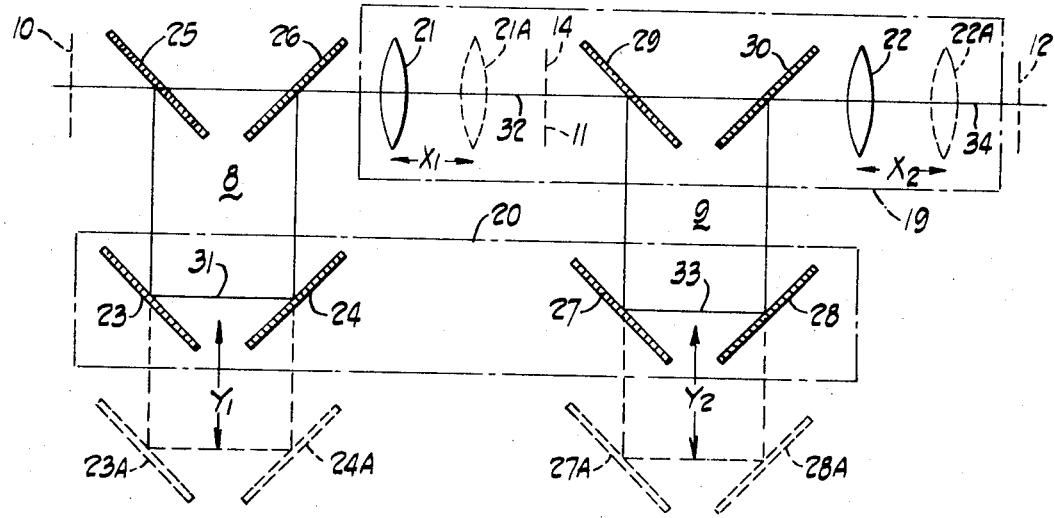
FIG. 1 is the preferred embodiment of the present invention.

FIG. 1 shows a variable magnification optical system in accordance with the disclosed invention. The system illustrated in FIG. 1 contains a first optical plane 10, a second optical plane 11, a third optical plane 14 and a fourth optical plane 12. The second optical plane 11 is coincident with the third optical plane 14 and this combination is illustrated as the single plane 11. Planes 10, 11 and 12 are arranged in a fixed spatial relationship to one another. The optical system can be considered to be composed of two subsystems arranged in tandem. A first subsystem 8 lies between planes 10 and 11. A second subsystem 9 of the optical system lies between planes 11 and 12. The system also contains a first imaging means or lens 21 and a second imaging means or lens 22. These imaging means are shown as lenses in FIG. 1. However, any means of focusing light is equally suitable. The first lens 21 can be moved along a line determined by the optical axis of the first lens. Similarly, the second lens 22 can be moved along a line determined by the optical axis of the second lens. Thus, lens 21 can be moved into any position between the original position 21 and the phantom position 21A and lens 22 can be moved into any position between position 22 and the phantom position 22A. The optical axis of each lens is coincident with the optical axis of the optical system. In situations involving the bending of light paths by mirrors, the axis of the system may be defined as the path taken by a central ray which traverses all refracting and reflecting elements in sequence. The optical system also includes a first and a second reflector system within the first and the second subsystems, respectively. The first reflector system is composed of reflecting surfaces 23-26 and the second reflector system is composed of reflecting surfaces 27-30. A first reflecting surface 23 is movable along a line determined by an incident beam to reflecting surface 23 which is coincident with the optical axis of the optical system. A second reflecting surface 24 is movable along a line determined by a reflected beam from reflecting surface 24 which beam is on the optical axis of the optical system. Similarly, in the second reflector system, a first reflecting surface 27 is movable along a line determined by an on-axis incident beam to reflecting surface 27 and a second reflecting surface 28 is movable along a line determined by an on-axis reflected beam from reflecting surface 28. The reflecting surfaces or reflectors 23, 24, 27 and 28 can be moved into any position between the original positions 23, 24, 27 and 28 and the phantom positions 23A, 24A, 27A and 28A, respectively.

A first optical path 31 is measured from the first optical plane 10 to the first lens 21. A second optical path 32 is measured from the first lens 21 to the second optical plane 11. The sum of the first and second optical paths 31 and 32 equals the total optical path of the first subsystem 8. A third optical path 33 is the path from the third optical plane 14 to the second lens 22, and a fourth optical path 34 is the path from the second lens 22 to the fourth optical plane 12. The sum of the third and fourth optical paths equals the total optical path of the second subsystem 9. The movements of the first lens 21 and the first and second reflecting surfaces 23 and 24 of the first reflector system constitute a first and a second optical means, respectively, to change the optical paths within the first subsystem 8. Similarly, the movements of the second lens 22 and the first and second reflecting surfaces 27 and 28 of the second reflector system constitute a third and a fourth optical means, respectively, to change the optical paths within the second subsystem 9. When the reflecting surfaces 23 and 24 are moved into positions 23A and 24A, respectively, the first optical path 31 from the first optical plane 10 to the first lens 21 is increased by an amount equal to $2Y_1$. This change in the optical path length 31 has no effect on the second optical path 32 from lens 21 to plane 11. When the first lens 21 is moved into the phantom position 21A, the second optical path 32 is decreased by an amount $X_1$ and the first optical path 31 is increased by the same amount. When an image is established on the first optical plane 10, a magnified image of that image appears on the second optical plane 11. As the first lens 21 is moved from the original position 21 to the phantom position 21A, the magnification of the image is decreased at the image plane of the lens. The movement of reflectors 23 and 24 is necessary in order to insure that the image plane of the lens coincides with the second optical plane 11. Therefore, the coordinated movements of the first optical means, lens 21, and the second optical means, reflecting surfaces 23 and 24 are necessary to produce a variation in the magnification from plane 10 to plane 11. The coordinated displacements of the first lens 21 and the reflecting pair 23 and 24 are related to a first magnification $m_1$ between planes 10 and 11 by the following formulas:

$$X_1 = f_1 [1 - (1/m_1)] \quad (1)$$

$$Y_1 = (f_1/2) [m_1 + (1/m_1) - 2] \quad (2)$$

where $f_1$ is the focal length of lens 21, $X_1$ is the displacement of lens 21, and Y is the displacement of reflector pair 23 and 24.

The second subsystem 9 of the optical system operates in a manner similar to the first subsystem 8. The fourth optical means includes the movement of reflectors 27 and 28, toward the phantom positions 27A and 28A, respectively, to increase the third optical path length 33 from plane 11 to lens 22 by an amount equal to $2Y_2$. The third optical means includes the movement of lens 22 to the phantom position 22A to decrease the fourth optical path length 34 by an amount $X_2$ and to increase the third optical path length by the same quantity. The coordinated movements of the third and fourth optical means lens 22 and reflecting pair 27 and 28 are necessary to vary a second magnification from the third optical plane 14 to the fourth optical plane 12. The movements of the second lens 22 and the reflecting pair 27 and 28 are related to the second magnification $m_2$ between planes 14 and 12 by the following formulas:

$$X_2 = f_2 [1 - (1/m_2)] \quad (3)$$

$$Y_2 = (f_2/2) [m_2 - (1/m_2) - 2] \quad (4)$$

where $f_2$ is the focal length of second lens 22, $X_2$ is the displacement of the second lens 22, and $Y_2$ is the displacement of reflecting pair 27 and 28. The total magnification from the first optical plane 10 to the fourth optical plane 12 will be the first magnification $m_1$ from plane 10 to plane 11 times the second magnification $m_2$ from plane 11 to plane 12. Although the subsystems 8 and 9 are connected in tandem, the coordinated movement of lens 21 and reflecting pair 23 and 24 can be independent of the coordinated movement of lens 22 and reflecting pair 27 and 28. In addition, there is no restriction on the focal lengths of lenses 21 and 22. The focal lengths of lenses 21 and 22 can be the same or different from one another.

To decrease the first magnification $m_1$ in the first subsystem 8 of the optical system, reflecting surfaces 23 and 24 are moved toward the phantom positions 23A and 24A and the first lens 21 is moved toward the phantom position 21A. Similarly, to decrease the second magnification in the second subsystem 9 of the optical system, reflecting surfaces 27 and 28 are moved toward the phantom positions 27A and 28A and the second lens 22 is moved toward the phantom position 22A. To decrease the magnification in each of the subsystems 8 and 9, the lenses in each subsystem are moved in the same direction and the reflecting surfaces in each subsystem are moved in the same direction. Conversely, to increase the magnification in each of the subsystems 8 and 9, the lenses in each subsystem are moved in the same direction. If lenses 21 and 22 are selected to be of equal focal lengths, then $X_1 = X_2$ and $Y_1 = Y_2$ in Equations (1-4). Under these conditions, lenses 21 and 22 can be mounted on a first carriage or carrier 19 and the reflecting surfaces 23, 24 and 27, 28 can be mounted on a second carriage or carrier 20. This tandem system contains only two moving carriages; the first carriage 19 carrying two lenses 21 and 22, and the second carriage 20 carrying two reflecting surface pairs 23-24 and 27-28. This optical system has the same number of moving carriages as a single system yet requires only 16 percent of the motion for a single system for the same variation in magnification of 40:1, for example. The reduction in the number of moving carriages and the reduction in the total carriage motion, reduces the lateral displacement of the image during changes of the magnification. This simplifies the mechanical system required to change the magnification of the system. In addition, the stability of the system is increased by the fact that the three optical planes 10, 11 and 12 are in a fixed spatial relationship to one another. It is not necessary that plane 11 contains the second optical plane 11 and the third optical plane 14 in a coincident manner as is illustrated in FIG. 1. Any means to establish an image on the third optical plane 14 in conformity with the image on the second optical plane 11 is within the scope of this invention.

Figure 2:
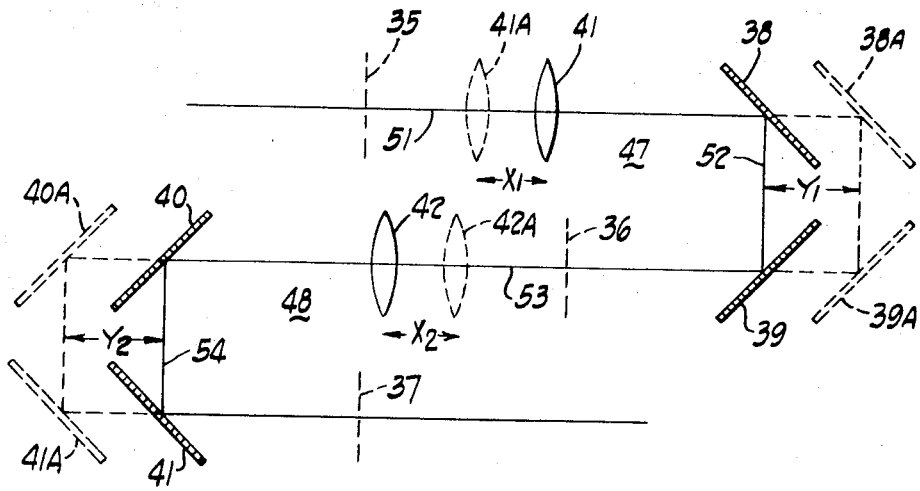
FIG. 2 is a modification of the invention.

FIG. 2 is a variation of the invention illustrated in FIG. 1. The system in FIG. 2 has a first optical plane 35, a coincident second and third optical plane 36, and a fourth optical plane 37. These planes are in a fixed spatial relationship with one another. The optical system can be considered as two subsystems. A first subsystem 47 is located between planes 36 and 37. The optical system has a first and second imaging means 41 and 42 shown as lenses which are free to move along the optical axis of the optical system. The optical system contains four reflecting surfaces in which each subsystem has one reflecting pair. A reflecting surface 38 moves along a line determined by an incident beam to the reflecting surface 38 from lens 41. Similarly, a reflecting surface 40 moves along a line determined by an incident beam from lens 42 to the reflecting surface 40. The reflecting surfaces 39 and 41 move along lines determined by the reflected beams to the respective surfaces from the reflecting surfaces 38 and 40. A first optical path 51 is established between the first optical plane 35 and the first lens 41 and a second optical path 52 is established between the first lens 41 and the second optical plane 36. This comprises the first subsystem 47 of the optical system. The second subsystem 48 of the optical system includes a third optical path 53 between the third optical plane 36 and the second lens 42 and a fourth optical path between the second lens 42 and the fourth optical plane 37.

The movement of the first and second imaging means 41 and 42 comprises a first and third optical means, respectively. The movement of the reflecting pairs 38, 39 and 40, 41 constitute a second and fourth optical means, respectively.

When the first lens 41 is moved into the position illustrated as 41A, the first optical path 51 is reduced by an amount $X_1$ and the second optical path 52 is increased by an amount $X_1$. The movement of the reflecting surface pair 38 and 39 into the phantom positions 38A and 39A, respectively, increases the second optical path 52 by an amount $2Y_1$. The movement of the second lens 42 into the phantom position illustrated as 42A, decreases the third optical path 53 by an amount $X_2$ and the fourth optical path 54 is increased by the same amount. When the reflecting surfaces 40 and 41 are moved to their locations 40A and 41A, respectively, the fourth optical path 54 is increased by an amount $2Y_2$. The movements of lenses 41 and 42 and reflecting surface pairs 38 and 39, and 40 and 41 are determined by equations (1) – (4) in a manner similar to lenses 21 and 22 and reflecting surface pairs 23-24 and 27-28, respectively, in FIG. 1. In contrast to FIG. 1, the lenses in FIG. 2 move in opposite directions during an increase in magnification of the optical system. In addition, the reflecting surfaces in the first subsystem move in an opposite direction to the reflecting surfaces in the second subsystem during changes in magnification. Only four reflecting surfaces and two lenses are required in FIG. 2, whereas the illustration in FIG. 1 required two lenses and eight reflecting surfaces. As was the case in FIG. 1, the first and second lenses 41 and 42 can be of dissimilar focal lengths and can be moved independently of one another. However, the movement of lens 41 must be in conformity with the movement of the reflecting surfaces 38 and 39 and the movement of lens 42 must be accompanied by an associated movement of the reflecting surfaces 40 and 41 as set forth in Equations 1-4). In contrast to FIG. 1, a light beam emanating from the first optical plane 35 first strikes the first lens 41 and then a reflecting surface before reaching the second optical plane 36. In FIG. 1, a light beam emanating from the first optical plane 10 first strikes a reflecting surface before passing through the first lens to the second optical plane 11. A combination of these two illustrations of FIG. 1 and FIG. 2 is compatible within a single system and within the scope of this invention.

Figure 3:
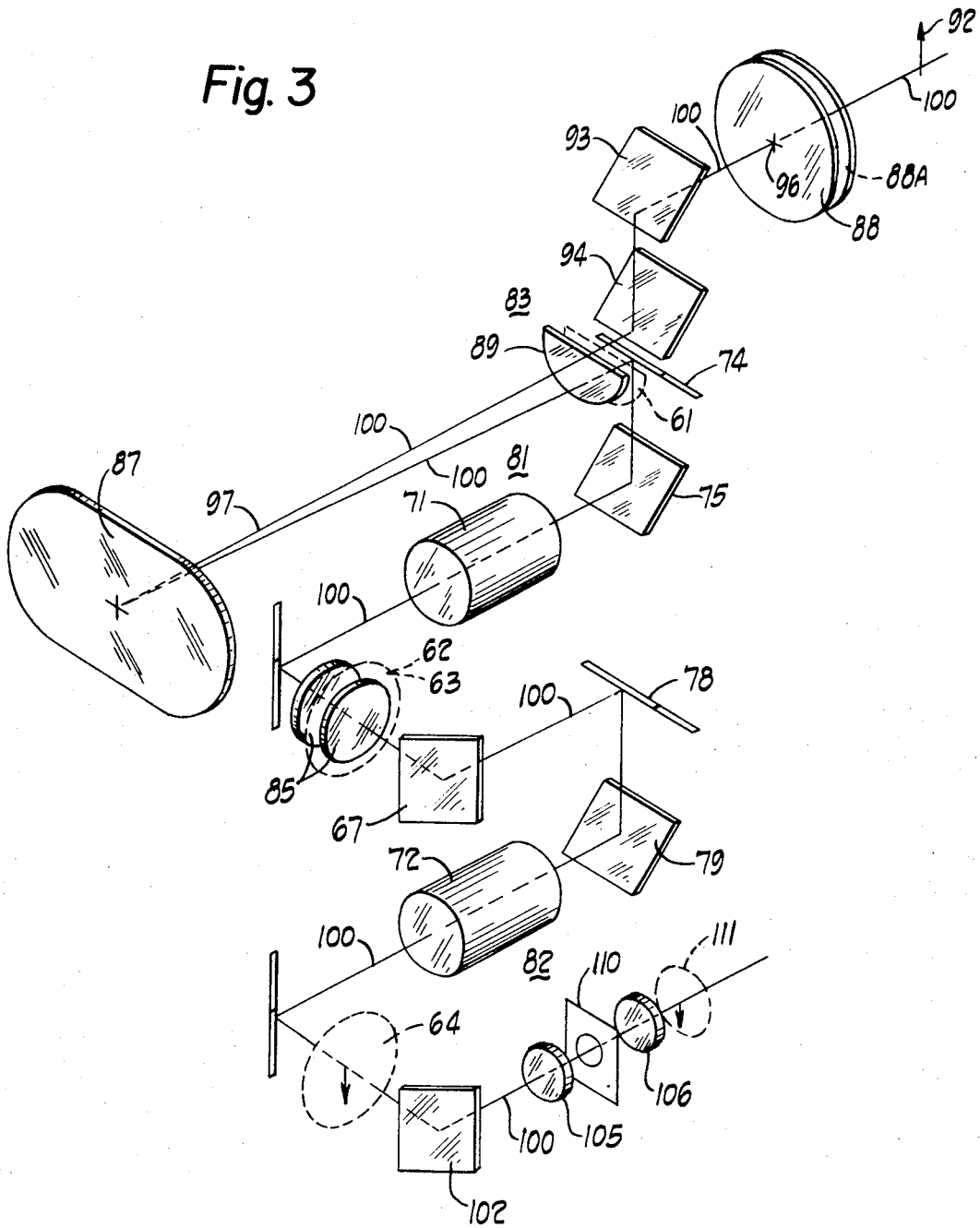
FIG. 3 is an application of the disclosed invention.

FIG. 3 shows an application of the invention illustrated in FIGS. 1 and 2. The optical system shown in FIG. 3 includes three sections. The optical system has a first subsection 81, a second subsection 82 and means 83 to establish an image on an optical plane of subsystem 81.

The first subsection 81 has a first optical plane 61 and a second optical plane 62. A first imaging means 71 is movable along the optical axis 100 of the optical system. The first subsystem 81 has a first and a second reflecting surface 74 and 75, respectively, which are movable to vary a first optical path between the first optical plane 61 and the first imaging means 71. The movement of a first imaging means 71 varies a second optical path from the first imaging means 71 to the second optical plane 62. The movement of the first and second reflecting surfaces 74 and 75 and the first imaging means 71 must conform to equations 1–4 to vary the magnification between the optical planes 61 and 62.

The second subsystem 82 is contained between a third optical plane 63 which is coincident with the second optical plane 62 and a fourth optical plane 64. The second subsystem 82 has a second imaging means 72, which is free to move along the optical axis 100 of the system. The second subsystem 82 also contains a first and a second reflecting surface 78 and 79 which are also free to move. The movement of the reflecting surfaces 78 and 79 vary a third optical path from the third optical plane 63 to the second imaging means 72. The movement of the second imaging means 72 varies a fourth optical path from the second imaging means 72 to the fourth optical plane 64. A pair of field lenses 85 one on either side of the optical plane 62, 63 aids in coupling the first subsystem 81 to the second subsystem 82.

The arrangement shown in FIG. 3 allows the first and second imaging means 71 and 72 to be mounted on a first carrier, not shown, and the four movable reflecting surfaces 74, 75, 78 and 79 to be mounted on a second carrier, not shown. This arrangement is possible when the first and second imaging means 71 and 72 have identical focal lengths.

The means 83 to establish an image on the first optical plane 61 includes a concave mirror 87, a correcting lens means shown as a pair of correcting lenses 88 and 88A, and a field lens 89. The concave mirror 87 has an optical axis 97 and the correcting lenses 88 and 88A have an optical axis 96. The concave mirror 87 is a spherical mirror and requires the correcting lenses to correct for spherical aberrations. The optical axis of the concave mirror 87 and the correcting lenses 88, 88A are each coincident with the optical axis 100 of the optical system. A pair of fixed mirrors 93 and 94 arrange the means 83 into a convenient form.

The field lens 89 is mounted in proximity to the first optical plane 61. The field lens 89 is in the form of a semicircle and has an optical axis offset with respect to the optical axis 100 of the optical system. Since the optical axis of lens 89 is offset with respect to the optical axis 100 of the optical system, the field lens 89 acts as both a prism and a lens to divert and converge the light rays propagating from the concave mirror 87 to the reflecting surface 74.

The system described in FIG. 3 is useful for the variable magnification of one-half of the field of view of the correcting lenses 88 and 88A. A typical application of this type of system would be in a training device for the submarine service. This system can simulate the view seen through a submarine periscope. In a periscope view simulator, only the hemisphere above the horizon requires a variable magnification to simulate the approach of ships or aircraft. The lower hemisphere is occupied exclusively by water and need not be magnified when the system simulates an approaching target, in order to better utilize the lens means 71 and 72. A wide range in magnification, typically 40:1, is required to simulate a target within the range of interest, for example, 500 yards to 20,000 yards.

An object 92 is shown situated in front of the correcting lenses 88 and 88A with the bottom of the object on the optical axis 100 of the optical system. This object could be a model of a ship or aircraft representing a target. The bottom hemisphere of the correcting lenses is not used since only the upper hemisphere of the field of view needs to be magnified. The mirror pair 93 and 94 reflect only the light transmitted through the upper hemisphere of the correcting lenses 88 and 88A to the concave mirror 87. The optical axis 100 of the optical system intersects the concave mirror 87 on the optical axis 97 of the mirror 87. Although only one-half of the field is covered, substantially all of the concave mirror receives image forming light. The concave mirror inverts the image and passes that image through the field lens 89. The offset field lens 89 diverts the image rays in the neighborhood of the first optical plane 61. The concave mirror 87 has been used to produce an image on the first optical plane 61 without any input wavefront interference as present in a typical Newtonian or Cassegrainian system. Thus, most of the surface of the mirror is used to convey an image of one-half of the field as distinguished from some prior art systems which use one-half of the surface of a mirror to convey the whole field.

The use of a concave mirror 87 and correcting lenses 88, 88A to produce an image on the first optical plane 61 offers the advantage of correcting the Petzval sum of the optical system. To eliminate the aberrations of curvature of field, at least two imaging means must be used which are so related that they will satisfy the Petzval condition. The Petzval condition is given by the following formula:

$$\Sigma(1/n_k f_k) = 0 \tag{5}$$

where $n$ is the index of a refraction and $f$ is the focal length of the imaging means. The negative Petzval value of the concave mirror 87 and the correcting lenses 88 and 88A are selected to compensate for the positive Petzval value of the first and second imaging means 71 and 72 as well as all ancillary lenses within the optical system. The result is an image substantially free from aberrations of curvature of field at a final image plane 111 of the optical system.

An image formed at the fourth optical plane 64 may be used in many ways. In the FIG. 3 embodiment the image is directed to a final image plane 111 by a reflecting surface 102. The image is formed on the final image plane 111 with the aid of two collimating lenses 105 and 106. An aperture 110 located between the collimating lenses 105 and 106 determines the entrance and exit pupils of the optical system. Since there are no moving elements between the aperture 110 and the final image plane 111, the exit pupil of the optical system is fixed in size and position irrespective of the magnification of the optical system. The image at the final image plane 111 will be at a constant intensity throughout the magnification range of the optical system. The exit pupil of the optical system is fixed in size and position which implies that there is a movement of the entrance pupil as a function of the magnification of the optical system. As a result, all components between the aperture 110 and the object 92 along the optical axis 100 must be selected to accommodate for a variable entrance pupil.

In an actual optical system constructed by the inventor in accordance with FIG. 3, the first and second imaging means 71 and 72 were mounted on a first carriage and the four movable reflecting surfaces 74, 75, 78 and 79 were mounted on a second carrier. The system contained only these two moving parts which greatly simplified the mechanical apparatus necessary to effect variations in magnification. The maximum magnification of the optical system from the first optical plane 61 to the fourth optical plane 64 in that system was unity. The fact that subsystems 81 and 82 operated at less than unity magnification reduced the tolerances of the mechanical apparatus necessary to move the reflecting surfaces and the imaging means. The system has demonstrated that variations in magnification of 40:1 are not only feasible but can be accomplished with extremely high image resolution. The 40:1 image variation simulates the range of a vessel or aircraft between 500 yards and 20,000 yards. Although only one-half of the area of the correcting lenses 88 and 88A is used, the remaining components are chosen to use substantially all useful area. Under the maximum entrance pupil conditions, substantially all of the useful area of the first and second lens means 71 and 72, the field lens 89, the concave reflecting surface 87 and all ancillary components except the correcting lenses 88 and 88A are used in the image transfer process. The concave reflecting surface 87 and correcting lenses 88 and 88A are able to accommodate models of ships and aircraft of approximately 12 inches long under the varying entrance pupil conditions. The resolution of an image transferred between the first optical plane 61 and the fourth optical plane 64 under the maximum magnification is 300 lines per millimeter indicating the tandem subsystems 81 and 82 transfer an image at essentially diffraction limited conditions.

The present disclosure includes that contained in the appended claims, as well as that of the foregoing description. Although this invention has been described in its preferred form with a certain degree of particularity it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A variable magnification optical system to transfer an image sequentially between first through fourth spatially fixed optical planes, comprising in combination,
   means establishing an image on the first plane,
   first imaging means for transferring an image between the first and second optical planes,
   said first imaging means establishing a first optical path from the first plane to said first imaging means and a second optical path from said first imaging means to the second plane,
   second imaging means for transferring an image between the third and fourth optical planes,
   said second imaging means establishing a third optical path from the third plane to said second imaging means and a fourth optical path from said second imaging means to the fourth plane,
   means establishing image transfer between the second and third optical planes,
   a first plurality of reflecting surfaces located in one of said first and second optical paths wherein a first of said surfaces of said first plurality of surfaces is movable,
   a second plurality of reflecting surfaces located in one of said third and fourth optical paths wherein a first surface of said second plurality of surfaces is movable,
   the focal length of said first imaging means being related to the focal length of said second imaging means,
   means for moving said first and second imaging means in unison and in accordance with the relation of the focal lengths of said first and second imaging means,
   and means for moving said first reflecting surfaces of said first and second plurality of reflecting surfaces in unison and in accordance with the movement of said first and second imaging means, respectively, to vary magnification.

2. A variable magnification optical system as set forth in claim 1 wherein the maximum magnification between said first and fourth planes is unity.

3. A variable magnification optical system as set forth in claim 1, wherein said first surface of said first and second plurality of reflecting surfaces moves along a line determined by an incident beam to each respective first reflecting surface, and a second reflecting surface in each of said first and second plurality of reflecting surfaces moves along a line determined by a reflected beam from each respective reflecting surface and wherein said beams are on the optical axis of the optical system.

4. A variable magnification optical system as set forth in claim 1, wherein said second optical plane is coincident with said third optical plane.

5. A variable magnification optical system as set forth in claim 1, wherein said means for moving said first and second imaging means changes the length of said at least one of said first and second optical paths by an amount $X_1 = f_1 [1-(1/m_1)]$, in which $f_1$ is said focal length of said first imaging means and $m_1$ is a first magnification from said first optical plane to said second optical plane and changes the length of said at least one of said third and fourth optical paths by an amount $X_2 = f_2 [1-(1/m_2)]$, in which $f_2$ is said focal length of said second imaging means and $m_2$ is a second magnification from said third optical plane to said fourth optical plane,
   and said means for moving said first reflecting surfaces of said first and second plurality changes the length of said one of said first and second optical paths by an amount $2Y_1 = f_1 [m_1 - (1/m_1) - 2]$ and changes the length of said one of said third and fourth optical paths by an amount $2Y_2 = f_2 [m_2-(1/m_2)-2]$.

6. A variable magnification optical system as set forth in claim 1, wherein said focal length of said first imaging means is equal to said focal length of said second imaging means,
   said means for moving said first and second imaging means includes first carrier means mounting said first and second imaging means for identical movement in unison, and said means for moving said first and second plurality of reflecting surfaces includes second carrier means mounting said reflecting surfaces for identical movement in unison.

7. A variable magnification optical system as set forth in claim 1, wherein said first and second imaging means includes lens means.

8. A variable magnification optical system as set forth in claim 7, wherein said means establishing said image on said first image plane includes a concave reflecting surface.

9. A variable magnification optical system as set forth in claim 8, wherein said concave surface is substantially spherical, and including aberration correcting means arranged in a generalized Schmidt system.

10. A variable magnification optical system as set forth in claim 9, wherein the combination of said concave surface and said correcting means has a negative Petzval sum which is substantially equal in magnitude to a positive Petzval sum of a combination of refracting surfaces including said first and second imaging means.

11. A variable magnification optical system as set forth in claim 9 including means diverting light from said concave reflecting surface to said first optical plane without interference with light to said concave surface.

12. A variable magnification optical system as set forth in claim 11, wherein said means diverting light includes offset field lens means.

13. A variable magnification optical system to transfer an image between first through fourth optical planes, comprising in combination, means establishing an image on the first plane, first imaging means for transferring an image between the first and second optical planes, said first imaging means establishing a first optical path from the first plane to said first imaging means and a second optical path from said first imaging means to the second plane, second imaging means for transferring an image between the third and fourth optical planes, said second imaging means establishing a third optical path from the third plane to said second imaging means and a fourth optical path from said second imaging means to the fourth plane, means establishing image transfer between the second and third optical planes, the focal lengths of said first and second imaging means being identical, first reflective means which is movable and located in one of said first and second optical paths, second reflective means which is movable and located in one of said third and fourth optical paths, first carrier means for identically moving said first and second imaging means, and second carrier means for identically moving said first and second reflective means in accordance with the movement of said first carrier means.

* * * * *